(12) United States Patent
Bouvet et al.

(10) Patent No.: US 10,542,472 B2
(45) Date of Patent: Jan. 21, 2020

(54) METHOD FOR CONFIGURING A TERMINAL CONNECTED TO A COMMUNICATIONS NETWORK

(71) Applicant: Orange, Paris (FR)

(72) Inventors: Bertrand Bouvet, Perros Guirec (FR); Fabrice Petesch, Ploubezre (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/550,979

(22) PCT Filed: Feb. 10, 2016

(86) PCT No.: PCT/FR2016/050295
§ 371 (c)(1),
(2) Date: Aug. 14, 2017

(87) PCT Pub. No.: WO2016/128676
PCT Pub. Date: Aug. 18, 2016

(65) Prior Publication Data
US 2018/0049086 A1    Feb. 15, 2018

(30) Foreign Application Priority Data
Feb. 13, 2015    (FR) ...................... 15 51210

(51) Int. Cl.
*H04W 4/00* (2018.01)
*H04W 36/08* (2009.01)
(Continued)

(52) U.S. Cl.
CPC ............. *H04W 36/08* (2013.01); *H04W 8/22* (2013.01); *H04W 36/0055* (2013.01); *H04W 48/20* (2013.01); *H04W 60/00* (2013.01)

(58) Field of Classification Search
None
See application file for complete search history.

(56) References Cited

U.S. PATENT DOCUMENTS 6,269,395 B1 * 7/2001 Blatherwick ..... G06F 17/30899
709/219
6,658,011 B1 * 12/2003 Sevanto .................. H04L 29/06
370/401
(Continued)

FOREIGN PATENT DOCUMENTS

EP    1257141 A1    11/2002

OTHER PUBLICATIONS

French Sear Report and Written Opinion dated Jan. 4, 2016 for corresponding French Application No. 1551210, filed Feb. 13, 2015.
(Continued)

*Primary Examiner* — Elisabeth Benoit Magloire
(74) *Attorney, Agent, or Firm* — David D. Brush; Westman, Champlin & Koehler, P.A.

(57) ABSTRACT

A terminal and a method for configuring such a terminal are provided for a user subscribed to an operator of a communication network, referred to as the nominal network, in order to access a communication service. The terminal is configured to access a first communication service via a first network access point. When the terminal is connected to a communication network other than the nominal network, referred to as a visited network, the terminal obtains data indicating whether the terminal can access a second communication service via said first network access point. In the case where the terminal cannot access the second communication service via the first network access point, the terminal determines a second network access point to be used by the terminal in order to access the second communication service and configures itself to be able to access the second communication service via the second network access point.

14 Claims, 3 Drawing Sheets

Figure 1:
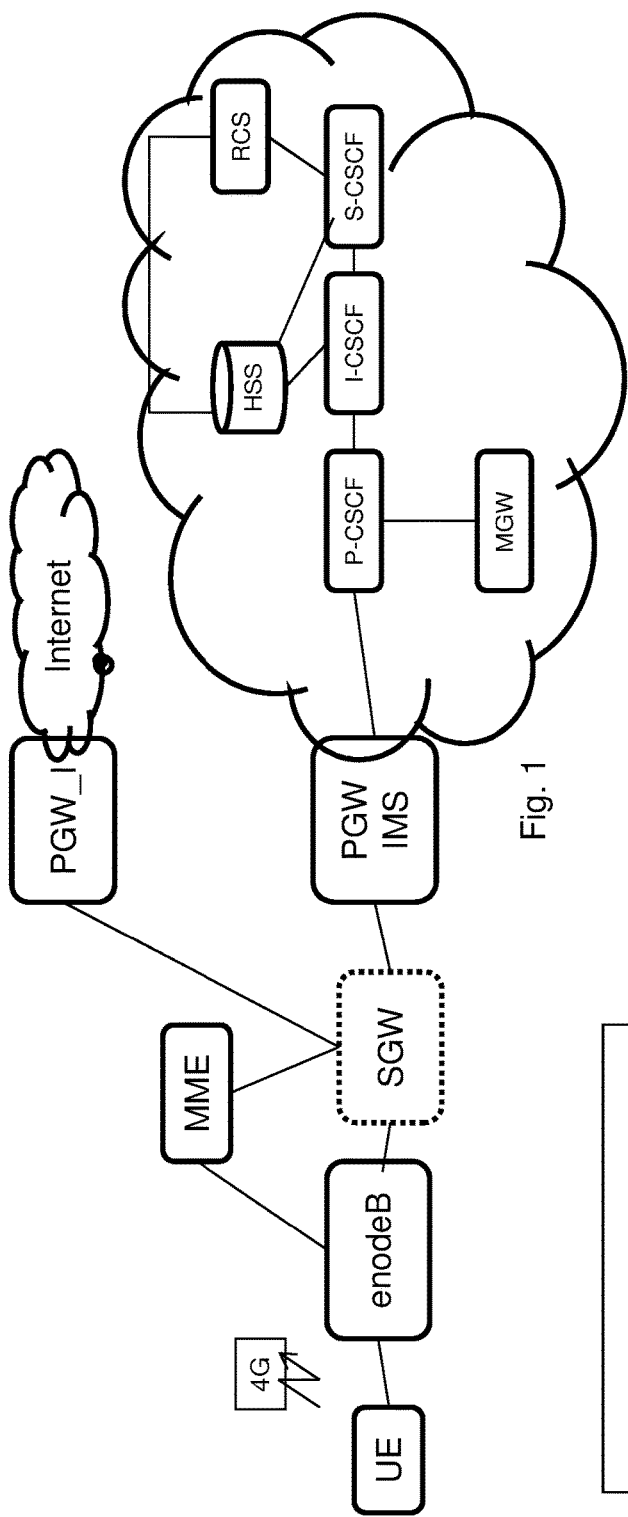

(51) Int. Cl.
*H04W 48/20* (2009.01)
*H04W 8/22* (2009.01)
*H04W 36/00* (2009.01)
*H04W 60/00* (2009.01)

(56) References Cited

U.S. PATENT DOCUMENTS

| | | | |
|---|---|---|---|
| 6,950,628 B1* | 9/2005 | Meier | H04L 12/4641 |
| | | | 340/7.1 |
| 6,973,303 B1 | 12/2005 | Meidan | |
| 6,987,779 B1* | 1/2006 | Sevanto | H04W 4/24 |
| | | | 370/469 |
| 8,270,369 B1* | 9/2012 | Chang | H04W 36/02 |
| | | | 370/254 |
| 9,253,704 B1* | 2/2016 | Sarkar | H04W 36/30 |
| 2004/0066769 A1* | 4/2004 | Ahmavaara | H04L 12/2856 |
| | | | 370/338 |
| 2006/0246901 A1 | 11/2006 | Sivakumar et al. | |
| 2007/0213053 A1* | 9/2007 | Do | H04W 8/02 |
| | | | 455/435.1 |
| 2008/0101291 A1* | 5/2008 | Jiang | H04L 63/08 |
| | | | 370/331 |
| 2009/0073943 A1* | 3/2009 | Krishnaswamy | H04W 88/04 |
| | | | 370/338 |
| 2009/0259639 A1* | 10/2009 | Shu | H04W 80/00 |
| 2012/0314571 A1 | 12/2012 | Forssell | |
| 2013/0064176 A1* | 3/2013 | Hsu | H04W 4/02 |
| | | | 370/328 |
| 2013/0094405 A1* | 4/2013 | Vrbaski | H04W 4/00 |
| | | | 370/259 |
| 2014/0078898 A1* | 3/2014 | Anchan | H04W 28/0268 |
| | | | 370/230 |
| 2014/0169286 A1* | 6/2014 | Xu | H04W 8/02 |
| | | | 370/329 |
| 2015/0358477 A1* | 12/2015 | Jeong | H04W 40/24 |
| | | | 370/259 |
| 2016/0021146 A1* | 1/2016 | Mufti | H04L 65/1016 |
| | | | 370/328 |
| 2016/0142931 A1* | 5/2016 | Mondal | H04L 67/141 |
| | | | 370/252 |
| 2016/0337898 A1* | 11/2016 | Jeong | H04W 28/0289 |

OTHER PUBLICATIONS

International Search Report dated May 2, 2016 for corresponding International Application No. PCT/FR2016/050295, filed Feb. 10, 2016.
Written Opinion of the International Searching Authority dated May 2, 2016 for corresponding International Application PCT/FR2016/050295, filed Feb. 10, 2016.
English Translation of Written Opinion of the International Searching Authority dated May 2, 2016 for corresponding International Application No. PCT/FR2016/050295, filed Feb. 10, 2016.
GSMA standard RCC.61, RCS Common Core Service Description Document, version 1.0, published Sep. 16, 2014.
GSMA IR92—IMS Profile for Voice and SMS, Version 7.0, published Mar. 3, 2013.
3GPP, TS123 003 v8.8.0 release 8 Digital Cellular Telecom System (Phase 2+)- Universal Mobile Telecommunications System (UMTS) Numbering, addressing and identification, section 9, published Apr. 2010.

* cited by examiner

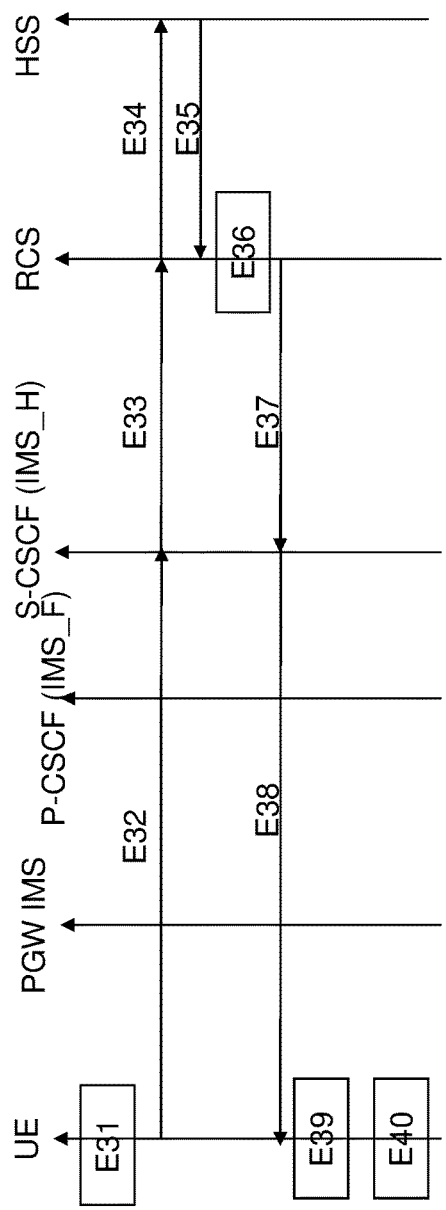
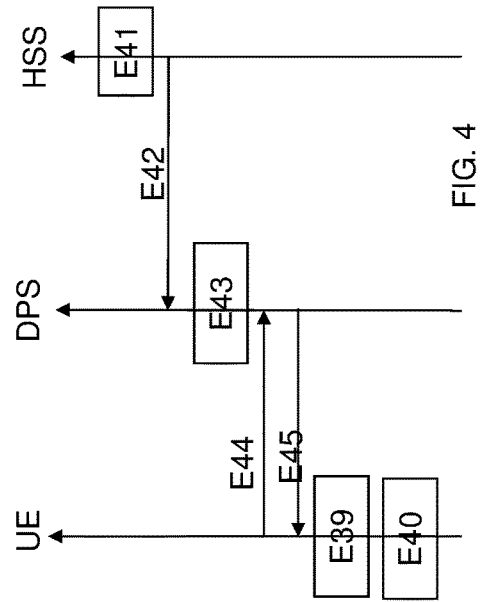
FIG. 3
FIG. 4

METHOD FOR CONFIGURING A TERMINAL CONNECTED TO A COMMUNICATIONS NETWORK

CROSS-REFERENCE TO RELATED APPLICATIONS

This Application is a Section 371 National Stage Application of International Application No. PCT/FR2016/050295, filed Feb. 10, 2016, the content of which is incorporated herein by reference in its entirety, and published as WO 2016/128676 on Aug. 18, 2016, not in English.

FIELD OF THE DISCLOSURE

The invention is situated in the field of mobile communications networks. It relates to a device and a method for configuring a terminal for accessing a communications service when the terminal is connected to a communications network different from the nominal communications network.

BACKGROUND OF THE DISCLOSURE

The service VoLTE (for Voice over Long Term Evolution) is a communications service of the voice type provided over a mobile communications network from a 4G access network. A mobile communications network allowing a VoLTE communications service to be provided is for example based on a conventional infrastructure of a circuit telephony network and of 2G/3G/4G data network (data). The core of the communications network or sub-system of the communications network is for example based on an IMS (for IP—Internet Protocol—Multimedia Subsystem) and an IP EPC (for Internet Protocol Evolved Packet Core) architecture. The VoLTE service is for example defined in the standard GSMA IR92—IMS Profile for Voice and SMS, Version 7.0, 3 Mar. 2013.

Such architectures and infrastructures are also used to provide other communications services to the terminals connected to the mobile network. For example, an enhanced communications service of the RCS (Rich Communication Suite) type may be provided. The RCS service is for example defined in the GSMA standard RCC61, RCS Common Core Service Description Document, version 1.0, 16 Sep. 2014.

In order for a terminal to be able to support a communications service of the VoLTE or RCS type, it is necessary for the terminal to dispose of a protocol stacking mechanism, otherwise known as an IMS SIP stack when the protocol used is the SIP (for Session Initiation Protocol) protocol. Such a protocol stack allows the terminal to communicate with the sub-system of the IMS mobile communications network. The IMS SIP stack of the terminal allows the terminal to register in the sub-system of the IMS mobile communications network via the SIP (for Session Initiation Protocol) protocol, then to receive and/or to transmit communications according to a communications service based on an IMS architecture. Such communications services are for example the VoLTE, RCS, ViLTE communications services (for Video over LTE), VoWIFI (for Voice over WIFI).

In order to save the battery life of the terminal and to reduce the number of reporting messages within the mobile communications network, a single IMS SIP stack may be used in the terminal in order to provide several communications services based on the IMS architecture. Thus, for example, for a terminal designed to implement a VoLTE communications service and an RCS communications service, the reporting streams for VoLTE or RCS communications will be transmitted according to the SIP protocol to the IMS sub-system, the media streams for a VoLTE communication will be transmitted according to the RTP/RTCP protocol and the media streams for an RCS communication of the messaging type will be transmitted according to the MSRP protocol.

It is assumed that the communications network of an operator to which a user is subscribed implements such a mechanism according to which only one IMS SIP stack is needed to provide several communications services based on the IMS architecture. The communications network of the operator to which a user is subscribed is commonly called nominal network or HOME network. When a user turns on his/her terminal, the terminal automatically connects to his/her HOME communications network when an access point to this network is accessible for the terminal.

When the user changes location, for example when he/she changes country, the HOME communications network might no longer be available if the operator to which the user is subscribed has not deployed any infrastructures within this country.

In this case, in general, the operator to which the user is subscribed has negotiated "roaming" agreements with one or more other operator(s) who dispose(s) of communications network infrastructures within the country in which the user is located. Such a communications network is subsequently referred to as a visited network. When a terminal is connected to a visited network, the terminal is said to be in a "roaming out" situation.

Such agreements allow interconnections between the visited communications network and the nominal communications network to be physically established. Thus, when the terminal of the user can connect to the visited communications network, it may access communications services provided by the visited communications network or the nominal communications network.

The services accessible by the terminal of the user when the terminal is connected to a visited communications network depend on the interconnections established, and hence on the agreements negotiated between the two operators. Thus, for example, it is possible for an interconnection to be established between the visited communications network and the nominal communications network in order to provide a VoLTE communications service to the terminal of the user when this terminal is connected to the visited communications network.

However, it is also possible for an interconnection not to be established between the visited communications network and the nominal communications network in order to provide an RCS communications service. For example, the absence of such an interconnection may be caused by the absence of roaming agreements between the two operators for this communications service, or because the visited communications network is not able to provide the RCS communications service, for example since the visited communications network is lacking network resources dedicated to the service in question.

Thus, when the terminal of a user is connected to a visited communications network, the user suffers a loss of quality of experience since the user then no longer has access to services, for example the RCS service in our example, to which he/she usually has access when his/her terminal is connected to the nominal communications network.

SUMMARY

An aspect of the present disclosure relates to a method for configuring a terminal of a user subscribed to an operator of a communications network, called nominal network, in order to access a communications service. The terminal is configured for accessing a first communications service via a first network access point. The configuration method comprises, when the terminal is connected to a communications network different from the nominal network, referred to as visited network:
- a step for obtaining a data value indicating whether the terminal can access a second communications service via said first network access point,
- in the case where the terminal cannot access the second communications service via the first network access point:
  - a step for determination of a second network access point to be used by the terminal for accessing the second communications service,
  - a step for configuring the terminal so that the terminal can access the second communications service via the second network access point.

In a correlated manner, the invention relates to a terminal of a user subscribed to an operator of a communications network, called nominal network, for accessing a communications service. The terminal is configured for accessing a first communications service via a first network access point. When the terminal is connected to a communications network different from the nominal network, called visited network, such a terminal is configured for:
- obtaining a data value indicating whether the terminal can access a second communications service via said first network access point,
- in the case where the terminal cannot access the second communications service via the first network access point, the terminal is configured for:
  - determining a second network access point to be used by the terminal for accessing the second communications service,
  - accessing the second communications service via the second network access point.

For example, the first communications service is a VoLTE or ViLTE communications service for which the operator of the visited network and the operator of the nominal network have negotiated interconnection agreements. The second communications service may be an RCS communications service for which the operator of the visited network and the operator of the nominal network have not negotiated any interconnection agreement or the visited network is not able to provide the RCS communications service.

When the terminal is connected to the nominal network, a same protocol stack activated in the terminal is used to provide the first and the second communications services to the terminal.

When the terminal is connected to the visited network via a first network access point used for carrying the first communications service, a first protocol stack is activated within the terminal and associated with the first network access point.

According to the invention, when the second communications service cannot be carried via the first network access point, the terminal is configured in such a manner that it can access the second communications service via a second network access point. For example, a step for configuring the terminal corresponds to the activation in the terminal of a second protocol stack associated with the second network access point. Thus, the second communications service is provided to the terminal via the second protocol stack and carried via the second network access point. Such a second network access point may be a network access point of the visited network or of the nominal network.

The user of the terminal can thus access the second communications service when no roaming agreement has been negotiated between the operators for the second communications service or when the visited network does not dispose of the resources necessary for the implementation of the second communications service. The user thus has no loss of access to his/her communications services when he/she is in a "roaming out" situation.

Advantageously, the second protocol stack is only activated in the terminal when the terminal detects that the second communications service cannot be carried via the first network access point. Thus, the consumption of the battery of the terminal is optimized since the second protocol stack is only activated when needed. In addition, the resources of the nominal network are also optimized.

The invention is preferably applicable to mobile communications networks since the problem of roaming is only posed for this type of communications networks.

The various embodiments or features mentioned hereinafter may be added, independently or in combination with one another, to the features of the terminal defined hereinabove. The various embodiments or features mentioned hereinafter may be added, independently or in combination with one another, to the steps of the configuration method defined hereinabove.

According to one particular embodiment of the invention, the data value indicating whether the terminal can access a second communications service via said first network access point is obtained from a message replying to a request sent by the terminal to a server of the nominal network, via the first network access point.

According to this particular embodiment of the invention, the terminal uses the first network access point in order to obtain the data value indicating whether the terminal can access the second communications service via such an access point. This particular embodiment of the invention offers the advantage of not requiring the use of another network access point in order to obtain the data value in question. Indeed, the terminal thus uses a network access point already used for accessing the first communications service in order to obtain the data value. Thus, the terminal only activates a second protocol stack when the data value received indicates that the second communications service cannot be carried via the first network access point.

Advantageously, the request relates to the second communications service. It is sent subsequent to the registration of the terminal with the nominal network for the first or the second communications service.

Thus, according to this variant, the configuration of the terminal for providing the second communications service is carried out as soon as the terminal has been registered. It is not necessary to wait for an attempt to establish a communication according to the second communications service, or the downloading of a configuration file relating to the second communications service.

According to another particular embodiment of the invention, the request is:
- a registration request sent to a registration server for registering the terminal for at least the first communications service or for at least the second communications service, or
- an interrogation message sent to an application server, said application server being a server dedicated to the second communications service, or a message for subscription to a subscription-notification mechanism relating to an event corresponding to the situation according to which the terminal is connected to a network different from the nominal network.

According to this particular embodiment of the invention, in order to obtain the data value indicating whether the terminal can access the second communications service via the first network access point, the terminal uses reporting messages (registration, interrogation, subscription) conforming to a reporting protocol that the first network access point is able to carry. According to the various alternatives of this particular embodiment of the invention, the data value may be obtained via the first network access point even if the first network access point cannot be used to carry the media streams relating to the second communications service.

Such alternatives provide implementations of the invention allowing the modification of the infrastructures of the communications networks to be limited, since only the servers of the nominal network are impacted. Thus, the implementation of the invention is independent of the infrastructures of the visited network.

According to another particular embodiment of the invention, said reply message comprises a data value indicating the second network access point.

Advantageously, according to this particular embodiment of the invention, the reply message comprises information allowing the terminal to determine the second network access point. Such information is supplied by a server for managing communications of the nominal network. The terminal may thus activate a second protocol stack associated with the second network access point depending on criteria defined by the operator of the nominal network.

According to another particular embodiment of the invention, the data value indicating whether the terminal can access a second communications service via said first network access point is obtained from a configuration file relating to the second communications service received by the terminal from a server of the nominal network.

According to this particular embodiment of the invention, the terminal is informed by the nominal network that the second communications service cannot be provided via the first network access point, at the time when the terminal carries out the configuration steps for supplying the second communications service, such as at the start-up of the terminal, or when a period of validity of registration for the second communications service has expired, or else when the registration of the terminal for the second communications service was unsuccessful.

According to another particular embodiment of the invention, the configuration file comprises a data value indicating a network access point to be used when the terminal is connected to the visited network. According to this particular embodiment of the invention, the second protocol stack is activated in the terminal when the network access point provided in the configuration file and the first network access point of the visited network are different.

Advantageously, when the network access point provided in the configuration file and the first network access point of the visited network are different, the terminal knows which network access point of the visited network must be associated with the second activated protocol stack.

According to another particular embodiment of the invention, the data value indicating whether the terminal can access a second communications service via said first network access point is obtained from a data value associated with the first network access point obtained during the procedure for attachment of the terminal to the visited network.

According to this particular embodiment of the invention, data relating to the services supported by a network access point of a communications network are supplied to the terminal when the terminal is attached to the visited communications network. Thus, as soon as the terminal is connected to the communications network via the network access point, the terminal is aware of the communications services supported by said network access point.

The invention also relates to a method for supplying to a terminal of a user subscribed to an operator of a communications network, called nominal network, a data value indicating whether the terminal can access a first communications service via a first network access point. Such a supply method comprises:
- a step for receiving, by a server of the nominal network, a request relating to the first communications service, sent by the terminal via the first network access point,
- a step for detecting that the terminal is connected to a communications network different from the nominal network, called visited network,
- when the terminal is connected to the visited network, a step for determination of a data value indicating whether the terminal can access the first communications service via said first network access point,
- a step for sending a message, comprising a message comprising said data value, to the terminal.

In a correlated manner, the invention relates to a device for supplying to a terminal of a user subscribed to an operator of a communications network, called nominal network, a data value indicating whether the terminal can access a first communications service via a first network access point. Such a supply device is configured for:
- receiving a request relating to the first communications service sent by the terminal, via the first network access point,
- detecting whether the terminal is connected to a communications network different from the nominal network, called visited network,
- when the terminal is connected to the visited network, determining a data value indicating whether the terminal can access the first communications service via said first network access point,
- sending a message comprising said data value to the terminal.

According to the invention, the operator of the nominal network can adapt the configuration of the terminal for the access of the terminal to a communications service when the terminal is connected to a visited network.

The various embodiments or features mentioned hereinafter may be added, independently or in combination with one another, to the features of the device defined hereinabove. The various embodiments or features mentioned hereinafter may be added, independently or in combination with one another, to the steps of the supply method defined hereinabove.

According to one particular embodiment of the invention, the supply method furthermore comprising a step for determining a second network access point to be used by the terminal for accessing the first communications service, the message sent comprising an identifier of the second network access point.

Thus, the server of the nominal network can dynamically adapt the network access point that the terminal has to use for accessing the first communications service. For example, when the roaming agreements between operators are modified, the operator of the nominal network can update the information in its databases. This particular embodiment of the invention does not require the operation of the terminal to be modified when the agreements between operators are modified.

In addition, the operator of the nominal network may establish a policy allowing the network access point to be used to be adapted according to the subscription of the user. Such a subscription may be modified regularly by the user. Or again, the operator of the nominal network may adapt the network access point according to the negotiated roaming agreement, for example if the agreement specifies a maximum number of connections authorized via the first network access point, etc.

According to another particular embodiment of the invention, the message is a configuration file relating to the first communications service.

According to this particular embodiment of the invention, when the access to the first communications service is configured by the downloading of a configuration file, for example for rich communications services RCS, the operator of the nominal network can dynamically update the configuration file relating to such a communications service when the terminal requests the downloading of the configuration file relating to the first communications service. Thus, the operator of the nominal network may dynamically adapt the access of the terminal to the services provided to the terminal taking into account the fact that the terminal is connected to a visited network and not to the nominal network.

According to another particular embodiment of the invention, the request relating to the first communications service is:
- a request for registration of the terminal for at least the first communications service with the nominal network, said first network access point being used by the terminal for accessing a second communications service,
- an interrogation message sent to an application server, said application server being a server dedicated to the second communications service, or
- a message for subscription to a subscription-notification mechanism relating to an event corresponding to the situation according to which the terminal is connected to a network different from the nominal network.

According to this particular embodiment of the invention, the operator of the nominal network may inform the terminal via reporting mechanisms able to be carried via the first network access point.

According to the various alternatives of this particular embodiment of the invention, the operator of the nominal network may inform the terminal of a network access point to be used for accessing the first communications service, as soon as the terminal is registered with the nominal network.

According to another particular embodiment of the invention, the second network access point via which the request relating to the first communications service is sent by the terminal is a network access point of the visited network.

According to this particular embodiment of the invention, the operators of the visited network and of the nominal network have negotiated interconnection agreements for at least the second communications service. For example, the second communications service is a VoLTE or ViLTE communications service. The terminal can thus use the second network access point of the visited network in order to register with the nominal network for the first communications service.

In one particular embodiment of the invention, the various steps of the configuration method and of the supply method are implemented by computer program instructions.

Consequently, the invention is also aimed at computer programs on an information medium, these programs being able to be respectively implemented in a terminal or, more generally, in a computer, these programs respectively comprising instructions adapted to the implementation of the various steps of the configuration method and of the various steps of the supply method which have just been described.

These programs may use any given programming language, and may take the form of source code, object code, or of code intermediate between source code and object code, such as in a partially compiled form, or in any other desired form.

The invention is also aimed at an information medium readable by a computer, and comprising instructions of a computer program such as mentioned hereinabove.

The information medium may be any given entity or device capable of storing the program. For example, the support may comprise a storage means, such as a ROM, for example a CD ROM or a microelectronic circuit ROM, or else a magnetic or electronic recording means, for example a USB stick or a hard disk.

On the other hand, the information medium may be a transmissible medium, such as an electrical or optical signal, which may be routed via an electrical or optical cable, by radio or by other means. The program according to the invention may in particular be downloaded over a network of the internet type.

Alternatively, the information medium may be an integrated circuit into which the program is incorporated, the circuit being designed to execute or to be used in the execution of the configuration method or of the supply method in question.

The advantages of the computer program comprising instructions designed to implement the various steps of the configuration method and of the computer program comprising instructions designed for the implementation of the various steps of the supply method are identical to those presented in relation with the configuration method and to those presented in relation with the supply method according to any one of the aforementioned particular embodiments.

LIST OF FIGURES

Figure 6:
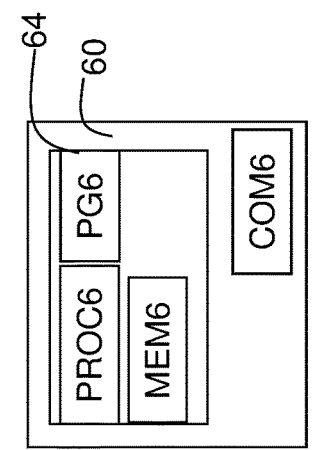
Figure 5:
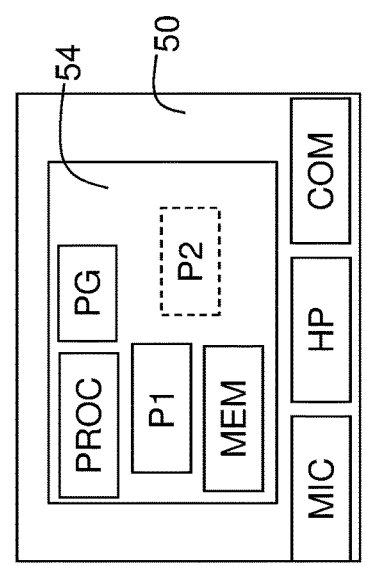
Figure 2:
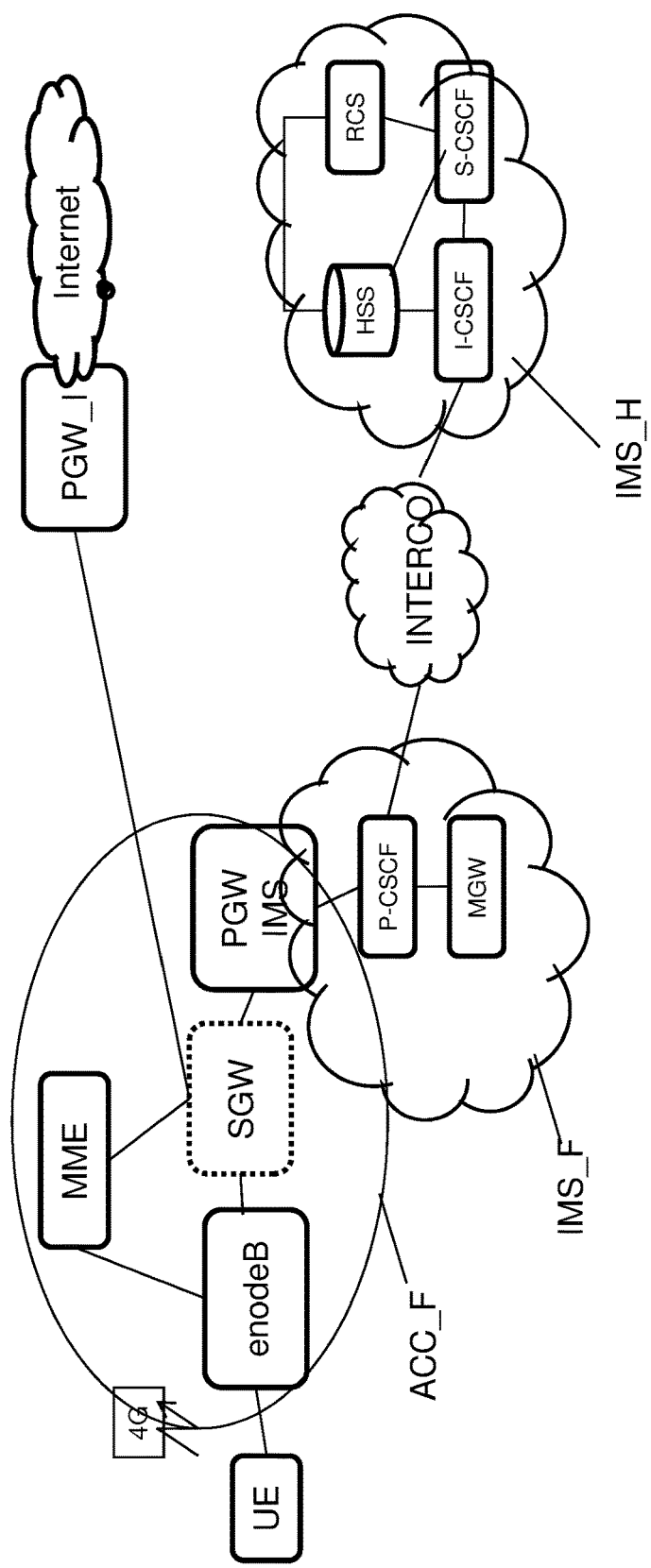

Others advantages and features of the invention will become more clearly apparent upon reading the following description of one particular embodiment of the invention, given by way of simple illustrative and non-limiting example, and from the appended drawings, amongst which:

FIG. 1 illustrates a mechanism for supplying a first and a second communications service to a mobile terminal when it is connected to its nominal network, FIG. 2 illustrates a mechanism for supplying a first and a second communications service to a mobile terminal when it is connected to a visited network, FIG. 3 illustrates steps of the configuration method according to one particular embodiment of the invention, FIG. 4 illustrates steps of the supply method according to one particular embodiment of the invention, FIG. 5 illustrates a device designed to implement the configuration method according to one particular embodiment of the invention, FIG. 6 illustrates a device designed to implement the supply method according to one particular embodiment of the invention.

DESCRIPTION OF ONE PARTICULAR
EMBODIMENT OF THE INVENTION

FIG. 1 illustrates schematically how a terminal UE accesses the VoLTE and RCS services provided by the operator to which the user of the terminal UE is subscribed when this terminal UE is connected to the mobile communications network of such an operator. Such a communications network is also called by those skilled in the art "nominal network" or "HOME network".

After its start-up, the terminal UE connects to the mobile communications network according to the network attachment procedure known to those skilled in the art. The terminal UE connects according to the 4G radio technology to an antenna eNodeB close to the terminal by transmitting a request AttachRequest to the eNodeB. The eNodeB then selects an MME (for Mobility Management Entity) server and relays the attachment request to the selected MME. The MME server carries out the authentication of the terminal UE based on the authentication data coming from the terminal UE and on authentication data obtained from an HSS server of the nominal network. When the authentication by the MME is successful, the MME server sends a message comprising the IMSI (for International Mobile Subscriber Identity) parameters of the terminal UE to the HSS server and an identifier of the MME server having supported the terminal UE. Such IMSI parameters allow the client account of the user of the terminal UE to be identified in a unique manner. Such a message is for example an Update Location Request message of the Diameter protocol. The HSS server thus stores the identifier of the MME having supported the terminal UE in association with the IMSI identifier of the terminal UE.

In return, the HSS server sends a message to the MME server, for example an Update Location Answer message of the Diameter protocol, comprising:
- the list of all the network access points, otherwise called APN (for Access Point Name) by those skilled in the art, that the terminal UE can use for carrying data relating to the communications services that the terminal UE wishes to use,
- an indication of a network access point to be used by default, and
- QoS (for Quality of Service) parameters associated with each network access point included in the list.

Here, network access point is understood to refer to an APN for Access Point Name. It is known by those skilled in the art that an APN, or access point name, is an identifier which allows a terminal of a user of mobile telephony of a 2G or 3G network to connect to a sub-system (for example the Internet or IMS) by identifying the node GGSN (for Gateway GPRS Support Node) that it can use. The APN generally consists of a code identifying the GGSN, and hence the sub-system behind this GGSN, and MCC and MNC codes identifying the operator of the mobile network (3*GPP TS*123 003 *v*8.8.0 *release* 8 (2010-04) *Digital Cellular Telecom System (Phase* 2+)—*Universal Mobile Telecommunications System (UMTS) Numbering, addressing and identification, section* 9).

Such network access points are determined by the HSS server according to the client profile which is defined according to the subscription of the user of the terminal UE to his/her operator.

The MME server subsequently establishes a default carrier or bearer associated with the default network access point used by the terminal UE. For example, the default network access point is a network access point associated with the Internet network, referred to in the following as Internet APN. The MME server communicates with the SGW gateway (for Serving Gateway) of the nominal network which determines the access gateway PGW (for Packet Data Network Gateway) that the terminal has to use for accessing the nominal IP communications network.

The SGW gateway determines the access PGW gateway to be used depending on the parameters of the network access point for which the MME has established a default bearer. In the example described here, the SGW gateway selects the access PGW_I gateway which is placed at an interconnection of the mobile access network of the operator of the terminal UE and of the Internet communications network.

The access PGW_I gateway allocates a first IP address to the terminal UE. This first IP address allows the terminal UE to access the services of the Internet via the Internet APN network access point previously established. Such a network access point is associated with a "best effort" QoS (for Quality of Service).

When the terminal UE is compatible with the VoLTE communications service, the terminal UE sends a request to the nominal network for the establishment of a default bearer associated with a second network access point, henceforth referred to as IMS APN, for carrying the data relating to the VoLTE communications service. The default bearer associated with an IMS APN network access point is associated with a predetermined QoS. For example, such a QoS is defined by means of a QCI (for QoS Class Identifier) parameter with a value of 5. Such a QCI value indicates that the data carried via the IMS APN network access point is carried with the highest priority, with very few packet losses.

For the IMS APN network access point such as defined hereinabove, the SGW gateway will select an access IMS PGW gateway placed at the interconnection of the mobile access network of the operator of the terminal UE and of the IMS sub-system of the operator of the terminal UE.

The IMS PGW gateway allocates a second IP address to the terminal UE. This second IP address allows the terminal UE to access the communications services provided by the IMS sub-system of the nominal communications network, such as the VoLTE service.

The IMS APN network access point of the terminal UE is thus established. The terminal UE then activates a protocol stack, here a stack according to the IMS SIP protocol, in order to provide the communications services implemented according to the SIP protocol on an IMS architecture, such as the VoLTE and RCS services, or other services. Such a protocol stack comprises an assembly of programmable data handlers allowing the communications services to be provided for the terminal UE. When the IMS SIP protocol stack is activated, the terminal UE registers with the IMS sub-system of the nominal operator so as to be able to access the VoLTE and RCS communications services for example. Such a registration request is for example sent to the P-CSCF server of the nominal network in the form of an SIP message Register. The IP address of the P-CSCF server has been supplied to the terminal UE when the IMS APN network access point was established for the terminal UE. Conventionally, the SIP message Register is transmitted by the P-CSCF to the S-CSCF of the nominal network so as to authenticate the terminal UE based on the authentication data supplied by the HSS server of the nominal network.

When the authentication is successful, the S-CSCF server sends an SIP message 200Ok to the terminal UE informing the terminal UE that the authentication was successful and that the VoLTE communications service is available.

The "Third Party Registration" procedure, defined by the SIP protocol, allows applications servers to be informed of the registration of a terminal in the sub-system of the communications network, so that the applications servers thus informed can activate services relating to the terminal UE.

As the terminal UE is RCS compatible, the SIP message Register sent to the P-CSCF server comprises an identifier of the RCS services supported by the terminal in the address of contact (AoC) field of the SIP message Register. The S-CSCF server is thus informed that the terminal UE supports the RCS services.

According to the "Third Party Registration" procedure, the S-CSCF server then informs the RCS application server of the nominal network of the registration of the terminal UE. Thus, the RCS application server activates the RCS communications service for the terminal UE.

Thus, according to the mechanism described with reference to FIG. 1, the terminal UE can implement the VoLTE communications service and the RCS communications service via a single IMS SIP protocol stack activated within the terminal UE. Indeed, such services use the same SIP reporting protocol.

In order to differentiate the VoLTE and RCS communications services when they are implemented by the terminal UE, the IMS sub-system of the nominal network and the terminal UE identify each service using the identifiers of services present in an AoC field of the messages sent out or received relating to the communications service implemented.

In the case of a communication established according to the VoLTE communications service, the media streams of the communication will be transmitted according to the RTP/RTCP protocol and managed by compatible MGW equipment of the nominal network.

In the case of a communication of the messaging type established according to the RCS communications service, the media streams of the communication will be transmitted according to the MSRP protocol and managed by compatible MGW equipment of the nominal network.

FIG. 2 illustrates schematically how the terminal UE accesses the VoLTE and RCS services provided by the operator of his/her nominal network when this terminal UE is connected to a visited mobile communications network.

In the example described here, the operator of the nominal network and the operator of the visited network have negotiated roaming agreements for the VoLTE communications service. Thus, the IMS_H sub-system of the nominal network and the IMS_F sub-system of the visited network are interconnected via a network interconnection INTERCO. For better clarity, only the elements of a communications network (core) sub-system relevant to the description of the invention have been shown here.

According to the example described here, the terminal UE is attached to the visited network by connecting to the access network ACC_F of the visited network via the eNodeB of the visited network. The MME of the visited network contacts the HSS of the nominal network in order to carry out the authentication of the terminal UE. When the authentication is successful, the MME server of the visited network transmits a message to the HSS of the nominal network comprising the IMSI parameters of the terminal UE and an identifier of the MME server having supported the terminal UE. The HSS server of the nominal network can then detect, based on the identifier of the MME server, that the terminal UE is in a roaming situation. As the operator of the nominal network and the operator of the visited network have negotiated roaming agreements for the VoLTE communications service, the HSS server then sends to the MME server of the visited network a list of network access points comprising an IMS APN network access point and an Internet APN network access point.

In the example described here, it is assumed that the Internet APN network access point operates in an interconnection mode called "Home Routed" mode. In such an interconnection mode, the SGW gateway of the visited network is interconnected to the PGW_I gateway of the nominal network.

In the example described here, it is assumed that the IMS APN network access point operates in an interconnection mode called "Local Break Out" mode. In such an interconnection mode, the P-CSCF server of the IMS_F sub-system is interconnected to the I-CSCF/S-CSCF server of the IMS_H sub-system. The SIP reporting streams then transit via the P-CSCF server of the visited network, then via the I/S-CSCF server of the nominal network.

The registration of the terminal UE with the IMS_H sub-system of the nominal network is made by sending an SIP message Register via the P-CSCF server of the visited network, then via the I/S-CSCF server of the nominal network. The registration of the terminal UE and the activation of the RCS services are subsequently carried out as described with reference to FIG. 1.

It is observed that, when the visited network does not support the RCS communications service or when a roaming agreement has not been negotiated for this service, the terminal UE cannot have access to the RCS communications service. However, such an unavailability of the RCS service is not known by the terminal UE when it is connected to the visited network. Indeed, the registration of the terminal UE for the VoLTE communications service was successful since the IMS_F sub-system and the IMS_H sub-system are interconnected. The terminal UE has therefore activated a protocol stack designed to implement the VoLTE and RCS communications services.

However, if no roaming agreement has been negotiated for the RCS communications service or if the MGW equipment of the visited network does not support the management of the media streams of the RCS communications service, when the terminal UE tries to establish a communication RCS of the messaging type with another terminal, the IMS_F sub-system will reject such a request for communication. Thus, the terminal UE will not have access to the RCS communications service when it is connected to the visited network.

One solution to such a problem is to activate, within the terminal UE, a second protocol stack SIP by using a network access point operating in "Home Routed" mode whenever the terminal UE detects that it is connected to the visited communications network and not to the nominal communications network.

For example, in the case described with reference to FIG. 2, the terminal UE can activate a second protocol stack SIP by using the Internet APN network access point as soon as it is connected to the visited network. Thus, the terminal UE accesses the communications services provided by the nominal network via the Internet APN network access point but with a quality of service associated with such a network access point that is called "best effort" and hence not guaranteed. The user of the terminal UE may then undergo a significant fall in the quality of experience in his/her use of the communications services when he/she is in a roaming situation.

Nor is such a solution optimal with regard to the power consumption of the battery of the terminal UE. Indeed, the activation of protocol stacks requires significant resources of the terminal UE. In addition, the activation of a second protocol stack also impacts the resources of the nominal communications network, since it involves an additional registration of the terminal UE in the IMS_H sub-system for the communications services that this stack implements, for example RCS.

Moreover, the use of such an additional protocol stack is not always necessary. Indeed, if roaming agreements have been negotiated between the operators for the RCS communications service, the activation of such an additional protocol stack is not useful. In this case, such a solution is not even desirable since the quality of service associated with such a protocol stack is lower than the quality of service of the RCS communications service which would be associated with the IMS SIP stack using the IMS APN network access point.

In the following, it is assumed that the operator of the nominal network defines a policy for accessing communications services, such as the RCS service, depending on the connection of the terminal UE. The operator of the nominal network stores, in the nominal network, for example in a client database, data relating to the network access points to be used which depend on the communications service to which the terminal wishes to have access, on the nominal or visited network to which the terminal is connected, potentially on the type of connection (2G/3G/4G, WIFI, fixed network, etc.), on the subscription of the user of the terminal, etc. . . . . For example, in the example described with reference to FIG. 2, when it is detected that the terminal UE is connected to the visited network, the network access point that the terminal UE has to use for accessing the RCS communications service is an Internet APN network access point of the nominal network or an HOS (for Home Operator Service) network access point of the nominal network, where such a network access point HOS exists.

FIG. 3 illustrates steps of the method for configuring a terminal UE according to one particular embodiment of the invention. It is assumed here that the visited communications network and the nominal communications network are interconnected such as described with reference to FIG. 2.

During a step E31, the terminal UE connects to the visited communications network via the access network ACC_F according to the attachment procedure such as described with reference to FIGS. 1 and 2. According to such an attachment procedure:
the IMS PGW gateway of the visited network allocates an IP address to the terminal UE, and
the MME server of the visited network establishes a default bearer of a first IMS APN network access point associated with a predetermined QoS, for example with a QCI value=5.

At the step E31, the terminal UE activates an IMS SIP protocol stack associated with the first IMS APN network access point and registers with the IMS_H sub-system for the VoLTE communications service as explained in relation to FIG. 2. Thus, the first IMS APN network access point is used by the terminal UE for accessing the VoLTE communications service.

During a step E32, the terminal UE sends a registration request to the P-CSCF server of the IMS sub-system-F for registering with the IMS_H sub-system and to gain access to the RCS communications service.

Such a registration request is for example an SIP message REGISTER, comprising an identifier of such a service, for example via "Features Tags" specific to the RCS communications service inserted into an AoC field of the SIP message REGISTER. The registration request sent by the terminal UE is sent via the IMS SIP protocol stack activated by the terminal UE and carried via the first IMS APN network access point.

During the step E32, the P-CSCF server of the visited network transmits such a registration request to the I/S-CSCF server of the nominal network which receives it during the step E32.

It is assumed here that the mechanism for "Third Party Registration" is implemented according to a "Terminated" mode. Such a mode implies that the S-CSCF server transmits the registration request to the RCS application server prior to sending a response to the registration request to the terminal UE.

Subsequent to the receipt by the S-CSCF server of the registration request, the S-CSCF server carries out the authentication of the terminal UE during a step E33.

During the step E33, the S-CSCF server transmits the registration request to the RCS application server. Subsequent to the receipt by the RCS application server of the registration request, the RCS application server interrogates the HSS server in order to obtain the data relating to the subscription of the user of the terminal UE, during a step E34. Such an interrogation is for example made via a request "User Data Request" of the Diameter protocol.

The HSS server has received, during the step E31, the information according to which the terminal UE is connected to the visited network. For example, the HSS server has obtained this information by virtue of the identifier of the MME server which has supported the terminal UE during its attachment to the access network ACC_F.

Thus, during a step E35, the HSS server detects that the terminal UE is connected to the visited communications network and not to the nominal communications network.

During the step E35, the HSS server determines, based on information stored in the nominal network, whether a roaming agreement has been negotiated for the RCS communications service with the operator of the visited communications network.

Depending on the information stored in the nominal network relating to such agreements, the HSS server determines whether the RCS communications service must be implemented by the terminal UE via a protocol stack distinct from the protocol stack used for the VoLTE communications service.

When the RCS communications service must be implemented by the terminal UE via a protocol stack distinct from the protocol stack used for the VoLTE communications service, the HSS server sends a response to the RCS application server, for example in the form of a response "User Data Answer" of the Diameter protocol, indicating that the terminal UE is in a roaming situation and that an additional protocol stack needs to be activated in the terminal UE. The RCS application server receives such a response during the step E35.

During a step E36, the RCS application server determines, based on the response from the HSS server, that the terminal UE is in a roaming situation and that an additional protocol stack must be activated by the terminal UE.

During a step E37, the RCS application server transmits a reply message to the S-CSCF server, for example an error SIP message 4xx, indicating that the terminal UE cannot access the RCS communications service via the first IMS APN network access point.

During a step E38, the S-CSCF server transmits such a reply message to the terminal UE which receives it via the first IMS APN network access point. During the step E38, thanks to the reply message, the terminal UE thus obtains a data value indicating that the terminal cannot access the RCS communications service via the first network access point.

During a step E39, the terminal UE determines a second network access point to be used for accessing the RCS communications service. For example, the terminal UE disposes of a list of network access points received during the step E31 for attachment to the visited communications network. The terminal UE can then select a default network access point, for example the Internet APN network access point associated with a "best effort" QoS. As a variant, the terminal UE disposes, within its SIM card, of the list of network access points which may be used in a "Home" situation (when the terminal UE is connected to the nominal network) and in a "Roaming out" situation (when the terminal UE is connected to a visited network).

During a step E40 for configuring the terminal UE, when the second network access point selected has not already been installed, in other words a default bearer has not been previously established for the terminal UE for the second network access point selected, the terminal UE first of all requests the establishment of a default bearer associated with the second access point selected. Such a request is made to the nominal network when the second network access point is an access point of the nominal network or to the visited network when the second access point is an access point of the visited network. During the step E40, when the second network access point selected is installed, in other words a default bearer has been established for the terminal UE for the second network access point selected, the terminal UE then activates a protocol stack associated with the second network access point determined during the step E39. Then, the terminal UE sends a request for access to the RCS communications service by means of such a protocol stack and via the second network access point. In the example described here, the access request is a registration request sent by the terminal UE to the IMS_H sub-system via the access PGW_I gateway.

According to one particular embodiment of the invention, during the step E36, the RCS application server determines a second network access point to be used by the terminal UE for accessing the RCS communications service, via a second protocol stack activated in the terminal UE. Such a determination is made based on data from the operator of the nominal communications network. For example, the operator of the nominal communications network may impose that the second network access point be the Internet APN network access point offering a "best effort" quality of service or an HOS (for Home Operator Service) network access point corresponding to a network access point associated with a default bearer associated with a guaranteed QoS, in other words with a predetermined value of QCI greater than 1, but whose streams transit via the PGW_I gateway of the nominal network placed at an interconnection of the mobile access network of the visited network to the Internet IP network of the nominal network. Such a network access point allows the media streams to be made to transit via the Internet network or via the network interconnection of the nominal and visited networks but with a guaranteed quality of service.

The application server RCS inserts an identifier of the second network access point determined in the reply message sent during the step E37.

Thus, according to this particular embodiment of the invention, during the step E39, the terminal UE determines the second network access point based on the identifier of the second network access point included within the reply message received during the step E38.

According to another particular embodiment of the invention, subsequent to the registration of the terminal UE with the IMS_H sub-system, during the step E32, the S-CSCF server sends an SIP message 200Ok to the terminal UE indicating that the terminal UE is registered with the IMS_H sub-system. According to this particular embodiment of the invention, the "Third Party Registration" mechanism may just as easily be implemented according to either the "Continue" mode or to the "Terminated" mode.

When the terminal UE receives the message acknowledging its registration, the terminal UE sends an interrogation message to the RCS server. Such an interrogation message may be sent in the form of an SIP message OPTIONS with a field SIP URI comprising the address of the RCS server of the nominal network. Subsequent to the receipt by the RCS server of such an interrogation message, the RCS server interrogates the HSS server in order to determine whether the terminal UE is connected to the nominal network or to a visited network. Such a step is similar to the step E34 described in FIG. 3. The response from the HSS server is similar to the step E35 described in FIG. 3.

The response from the HSS server comprises a data value indicating whether the terminal UE can access the RCS service via the IMS APN network access point and/or the second network access point to be used instead.

Based on the response from the HSS, the RCS server determines the second network access point that the terminal UE must use for accessing the RCS service and inserts this information into a reply message. This reply message takes for example the form of an SIP message 200Ok. The reply message is sent by the RCS server to the terminal UE.

Subsequent to the receipt by the terminal UE of the reply message sent by the RCS server, the terminal UE determines whether the network access point indicated in the reply message is identical to the IMS APN network access point from which the terminal UE has registered for the VoLTE communications service.

The network access point indicated in the reply message sent by the RCS server corresponds to a data value indicating whether the terminal UE can access the RCS service via the IMS APN network access point.

When such a network access point is different from the IMS APN network access point, the terminal UE carries out the step E40 such as described with reference to FIG. 3.

As a variant, the interrogation message sent by the terminal UE is only sent when the terminal UE detects that it is not connected to the nominal network.

Such a detection is for example carried out by the terminal UE by comparing the GUTI (for Globally Unique Temporary UE Identity) identity supplied by the MME server during the procedure for attachment to the access network, with an IMSI data value of the terminal UE. For example, the IMSI data value of the terminal UE is stored in the SIM card of the terminal UE. The terminal UE may detect that it is not connected to the nominal network when the MCC (for Mobile Code Country) field of the GUTI identifier of the MME server is different from the MCC field of the IMSI identifier of the terminal UE.

According to this variant, the resources of the nominal network and of the terminal UE are optimized since the interrogation message is only sent when it is necessary.

According to another particular embodiment of the invention, subsequent to the registration of the terminal UE with the IMS_H sub-system, during the step E32, the S-CSCF server sends an SIP message 200Ok to the terminal UE indicating that the terminal UE is registered with the IMS_H sub-system. According to this particular embodiment of the invention, the "Third Party Registration" mechanism may just as easily be implemented according to either the "Continue" mode or to the "Terminated" mode.

When the terminal UE receives the message acknowledging its registration, the terminal UE sends a message for subscription to an "Event Package", specific to the invention, for the attention of the RCS server or of another dedicated server. Such an "Event Package" is designed to supply a terminal UE connected to a visited network with the list of network access points that it can use for accessing the communications services provided by its nominal network. The subscription message is an SIP message SUBSCRIBE.

Upon receiving such a message, the RCS server responds by sending an SIP message 200Ok to the terminal UE. In a manner similar to the steps E34 and E35 described with reference to FIG. 3, the RCS server determines a list L1 of the network access points available for the terminal UE and the communications services to which the terminal UE has access via these network access points.

Then, the RCS server sends a message NOTIFY to the terminal UE comprising the list L1. For example, the list L1 in the message NOTIFY received by the terminal UE comprises:
- information indicating that the VoLTE communications service is available via an IMS APN network access point operating in Local Break Out mode,
- information indicating that the RCS communications service is available via an Internet APN network access point operating in Home Routed mode.
- The list L1 here also indicates the mode of operation of the network access point, in other words the type of interconnection used for accessing the communications service.
- Subsequent to the receipt by the terminal UE of the list L1, the terminal UE responds to the RCS server by an SIP message 200Ok.
- Based on the received list L1, the terminal UE determines whether the network access point indicated for the RCS communications service is identical to the IMS APN network access point using which the terminal UE has registered for the VoLTE communications service.

The information in the list L1 therefore corresponds to a data value indicating whether the terminal UE can access the RCS service via the IMS APN network access point.

When the network access point indicated in the list L1 for the RCS communications service is different from the IMS APN network access point, the terminal UE carries out the step E40 such as described with reference to FIG. 3.

As a variant, as for the embodiment described previously, the subscription to the specific Event Package is only sent when the terminal UE detects that it is not connected to the nominal network.

FIG. 4 illustrates steps of the supply method according to another particular embodiment of the invention.

In this particular embodiment of the invention, the terminal UE connects to the visited communications network such as described with reference to FIG. 2.

The terminal UE also registers with the IMS_H sub-system such as described with reference to FIG. 2. According to this particular embodiment of the invention, the operation of the RCS application server is not modified. The "Third Party Registration" mechanism may be implemented according to the "Terminated" or "Continue" mode. According to this particular embodiment of the invention, the terminal UE is not informed of the unavailability of the RCS communications service subsequent to the registration of the terminal UE for this service with the IMS_H sub-system such as described with reference to FIG. 2.

In order to configure the RCS communications service, the terminal UE uses a configuration file comprising the parameters linked to the service, such as the identity of the user, password, domain, the RCS capacities supported by the IMS_H sub-system, etc.

Such a configuration file is for example in the XML format. It is downloaded by the terminal UE when the terminal UE is turned on, or when the period of validity of the configuration file has expired, or else when the terminal UE has not succeeded in registering with the IMS_H sub-system for the RCS communications service.

As a reminder, when the terminal UE is attached to the visited network, the HSS server of the nominal network obtains the information according to which the terminal UE is connected to the visited network and not to the nominal network. For example, the HSS server has obtained this information thanks to the identifier of the MME server which has supported the terminal UE during its attachment to the access network ACC_F.

Subsequent to obtaining this information or subsequent to an interrogation of the RCS application server (similar to a step E34 described with reference to FIG. 3), during a step E41, the HSS server determines, based on information stored in the nominal network, whether a roaming agreement has been negotiated for the RCS communications service with the operator of the visited communications network.

Depending on the information stored in the nominal network relating to such agreements, the HSS server determines whether the RCS communications service must be implemented by the terminal UE via a protocol stack distinct from the protocol stack used for the VoLTE communications service.

During a step E42, the HSS server sends such information to a server for supplying DPS (for Device Provisioning Server) equipment of the nominal network IMS_H.

As a variant, the HSS server determines a network access point that the terminal UE must use for accessing the RCS service when it is connected to the visited network. For example, such a determination is carried out using data from the nominal operator stored in the nominal network. During the step E42, the HSS server sends the identifier of the network access point determined to the DPS server.

During a step E43, the DPS server then determines, based on the information received from the HSS server, that the terminal UE is in a roaming situation. During the step E43, the DPS server determines a network access point to be used by the terminal UE for accessing the RCS service when the HSS server has not provided it with such an identifier. For example, the DPS server determines a network access point of Internet APN or HOS APN type based on the data stored by the operator of the nominal network.

The HSS server stores the identifier determined or received as the case may be.

During a step E44, the terminal UE sends a request to the DPS server in order to obtain a file for configuring the terminal UE relating to the RCS communications service. For example, such a request takes the form of a request according to the http protocol. During the step E44, the DPS server receives such a request.

During a step E45, the DPS server updates the file for configuring the terminal UE by inserting the identifier of the network access point stored during the step E44 into the configuration file. Then, during the step E45, the DPS server sends the configuration file to the terminal UE.

During the step E45, the terminal UE receives the configuration file. Based on the configuration file comprising an identifier of the network access point to be used for accessing the RCS communications service, when the network access point indicated in the configuration file is different from the IMS APN network access point used by the terminal UE for accessing the VoLTE communications service, the terminal UE thus obtains a data value indicating that the terminal UE cannot access the RCS communications service via the IMS APN network access point.

During a step E39, the terminal UE determines, using the configuration file, the network access point to be used for accessing the RCS communications service.

During a step E40 for configuring the terminal UE, the terminal UE then activates a protocol stack associated with the network access point determined during the step E39. Then, the terminal UE sends by means of such a protocol stack and via the network access point identified in the configuration file, a request to access the RCS communications service. In the example described here, the access request is a registration request sent by the terminal UE to the IMS_H sub-system via the access PGW_I gateway.

According to another particular embodiment of the invention, the data value indicating whether the terminal can access the RCS communications service via the IMS APN network access point used by the terminal UE for accessing the VoLTE communications service is obtained from a data value associated with the IMS APN network access point. This data value is obtained during the procedure for attachment of the terminal to the visited network described with reference to FIG. 2. This data value is sent to the terminal UE by the MME server with the list of network access points that it can use for accessing its communications services. For example, each network access point of the list is associated with a list of identifiers of communications services which may be used via the network access point in question. For example, in the example described with reference to FIG. 2, the IMS APN network access point is associated with a list indicating a VoLTE, ViLTE communications service if the operators of the visited network and of the nominal network have negotiated roaming agreements for such communications services. The Internet APN network access point is associated with a list indicating an RCS communications service and data if the operators of the visited network and of the nominal network have not negotiated roaming agreements. The MME server of the visited network obtains the data associated with the network access points via the HSS server of the nominal network.

FIG. 5 illustrates a terminal 50 designed to implement the configuration method according to one particular embodiment of the invention described with reference to FIG. 2, 3 or 4.

The terminal 50 comprises a processing module 54, notably comprising a storage module MEM, for example a memory, and a processing unit PROC, equipped for example with a microprocessor. The processing unit PROC is controlled by a computer program PG implementing the configuration method such as described with reference to FIG. 2, 3 or 4.

Upon initialization, the code instructions of the computer program PG are for example loaded into memory MEM prior to being executed by the processor of the processing unit PROC.

The processor of the processing unit PROC implements the steps of the method for configuring the terminal of a user subscribed to an operator of a communications network, called nominal network, for accessing a communications service, according to the instructions of the computer program PG.

The terminal 50 is configured for accessing a first communications service via a first network access point, for example by means of a protocol stack P1 activated in the terminal 50 and associated with the first network access point.

The terminal 50 comprises a communications module COM allowing the terminal 50 to connect to a communications network, notably a communications network different from the nominal network, called visited network.

The processor of the processing unit PROC notably implements:
    a step for obtaining a data value indicating whether the terminal 50 can access a second communications service via said first network access point,
    in the case where the terminal 50 cannot access the second communications service via the first network access point:
        a step for determining a second network access point to be used by the terminal 50 for accessing the second communications network,
    a step for configuring the terminal 50 so that the terminal 50 can access the second communications service via the second network access point.

Notably, the terminal 50 is configured for activating a second protocol stack P2 when the second network access point is different from the first network access point.

Conventionally, the terminal 50 comprises means MIC for acquiring media streams (audio and/or video) such as a microphone and/or a camera and means HP for reproducing media streams (audio, video, text, etc.) such as loudspeakers and potentially a screen.

The terminal 50 may be a mobile telephone, a tablet, or any connected device capable of establishing communications over a mobile communications network.

FIG. 6 illustrates a device 60 designed to implement the supply method according to one particular embodiment of the invention described with reference to FIG. 2, 3 or 4.

The device 60 comprises a processing module 64, notably comprising a storage module MEM6, for example a memory, and a processing unit PROC6, equipped for example with a microprocessor. The processing unit PROC6 is controlled by a computer program PG6 implementing the supply method such as described with reference to FIG. 2, 3 or 4.

Upon initialization, the code instructions of the computer program PG6 are for example loaded into memory MEM6 prior to being executed by the processor of the processing unit PROC6.

The processor of the processing unit PROC6 implements the steps of the method for supplying to a terminal UE of a user subscribed to an operator of a communications network, called nominal network, a data value indicating whether the terminal UE can access a first communications service via a first network access point, according to the instructions of the computer program PG6.

The processor of the processing unit PROC6 notably implements:
- a step for receiving, by the device 60, a request relating to the first communications service, sent by the terminal UE,
- a step for detecting that the terminal UE is connected to a communications network different from the nominal network, called visited network,
- when the terminal UE is connected to the visited network, a step for determining a data value indicating whether the terminal UE can access the first communications service via said first network access point,
- a step for sending a message comprising said data value to the terminal UE.

According to one particular embodiment of the invention, the processor of the processing unit PROC6 also implements a step for determining a second network access point to be used by the terminal UE for accessing the first communications service, the message sent comprising an identifier of the second network access point.

The device 60 comprises a communications module COM6 allowing the device 60 to send to the terminal UE a message comprising said data value.

The device 60 may be a server of the nominal network, such as the DPS server described in FIG. 4, or the RCS server described with reference to FIG. 3 or else the HSS server described with reference to FIG. 2.

Although the present disclosure has been described with reference to one or more examples, workers skilled in the art will recognize that changes may be made in form and detail without departing from the scope of the disclosure and/or the appended claims.

The invention claimed is:

1. A method for configuring a terminal of a user subscribed to an operator of a communications network, called nominal network, for accessing a communications service, the method comprising:
   when the terminal is connected to the nominal network, using, within the terminal, a first protocol stack associated with a first network access point for accessing a first communications service and a second communications service, distinct from the first communications service; and
   when the terminal is connected to a communications network different from the nominal network, called visited network, acts comprising:
   using said first protocol stack associated with the first network access point for accessing the first communications service,
   obtaining a data value indicating whether the terminal can access a second communications service via said first network access point,
   in the case where the terminal cannot access the second communications service via the first network access point:
      determining a second network access point to be used by the terminal for accessing the second communications service, and
      using, within the terminal, a second protocol stack associated with the second network access point for accessing the second communications service via the second network access point.

2. The method as claimed in claim 1, in which the data value indicating whether the terminal can access a second communications service via said first network access point is obtained from a message replying to a request sent by the terminal to a server of the nominal network, via the first network access point.

3. The method as claimed in claim 2, in which the request is:
   a registration request sent to a registration server for registering the terminal for at least the first communications service or for at least the second communications service, or
   an interrogation message sent to an application server, said application server being a server dedicated to the second communications service, or
   a message for subscription to a subscription-notification mechanism relating to an event corresponding to the situation according to which the terminal is connected to a network different from the nominal network.

4. The method as claimed in claim 2, in which said reply message comprises a data value indicating the second network access point.

5. The method as claimed in claim 1, in which the data value indicating whether the terminal can access a second communications service via said first network access point is obtained from a configuration file relating to the second communications service received by the terminal from a server of the nominal network.

6. The method as claimed in claim 5, in which the configuration file comprises a data value indicating a network access point to be used when the terminal is connected to the visited network.

7. The method as claimed in claim 1, in which the data value indicating whether the terminal can access a second communications service via said first network access point is obtained from a data value associated with the first network access point obtained during the procedure for attachment of the terminal to the visited network.

8. A method for supplying to a terminal of a user subscribed to an operator of a communications network, called nominal network, a data value indicating whether the terminal can access a first communications service via a first network access point, the method comprising the following acts performed by a server of the nominal network:
   receiving, by the server of the nominal network, a request relating to the first communications service, sent by the terminal via the first network access point, said request being a request for registration of the terminal for at least the first communications service with the nominal network, said first network access point being already used by the terminal for accessing a second communications service,
   detecting that the terminal is connected to a communications network different from the nominal network, called visited network,
   when the terminal is connected to the visited network, determining a data value indicating whether the terminal can access the first communications service via said first network access point, and
   sending a message comprising said data value to the terminal.

9. The method as claimed in claim 8, furthermore comprising determining a second network access point to be used by the terminal for accessing the first communications service, the message sent comprising an identifier of the second network access point.

10. The method as claimed in claim 8, in which the first network access point is a network access point of the visited network.

11. A terminal of a user subscribed to an operator of a communications network, called nominal network, for accessing a communications service, the terminal comprising:
- a processor; and
- a non-transitory computer-readable medium comprising instructions stored thereon, which when executed by the processor configure the terminal to perform acts comprising:
    - when the terminal is connected to the nominal network, using a first protocol stack associated with a first network access point for accessing a first communications service and a second communications service, distinct from the first communications service, and
    - when the terminal is connected to a communications network different from the nominal network, called visited network, acts comprising:
        - using said first protocol stack associated with the first network access point for accessing the first communications service,
        - obtaining a data value indicating whether the terminal can access a second communications service via said first network access point, and
        - in the case where the terminal cannot access the second communications service via the first network access point:
            - determining a second network access point to be used by the terminal for accessing the second communications service, and
            - using a second protocol stack associated with the second network access point for accessing the second communications service via the second network access point.

12. A device for supplying to a terminal of a user subscribed to an operator of a communications network, called nominal network, a data value indicating whether the terminal can access a first communications service via a first network access point, the device comprising:
- a processor; and
- a non-transitory computer-readable medium comprising instructions stored thereon, which when executed by the processor configure the device to perform acts comprising:
    - receiving a request relating to the first communications service sent by the terminal, via the first network access point, said request being a request for registration of the terminal for at least the first communications service with the nominal network, said first network access point being already used by the terminal for accessing a second communications service,
    - detecting whether the terminal is connected to a communications network different from the nominal network, called visited network,
    - when the terminal is connected to the visited network, determining a data value indicating whether the terminal can access the first communications service via said first network access point, and
    - sending a message comprising said data value to the terminal.

13. A non-transitory computer-readable medium comprising program code instructions stored thereon for execution of a method for configuring a terminal of a user subscribed to an operator of a communications network, called nominal network, for accessing a communications service, when the program is executed by a processor of the terminal, wherein the method comprises:
- when the terminal is connected to the nominal network, using, within the terminal, a first protocol stack associated with a first network access point for accessing a first communications service and a second communications service, distinct from the first communications service; and
- when the terminal is connected to a communications network different from the nominal network, called visited network, acts comprising:
    - using said first protocol stack associated with the first network access point for accessing the first communications service,
    - obtaining a data value indicating whether the terminal can access a second communications service via said first network access point,
    - in the case where the terminal cannot access the second communications service via the first network access point:
        - determining a second network access point to be used by the terminal for accessing the second communications service, and
        - using, within the terminal, a second protocol stack associated with the second network access point for accessing the second communications service via the second network access point.

14. A non-transitory computer-readable medium comprising program code instructions stored thereon for execution of a method for supplying to a terminal of a user subscribed to an operator of a communications network, called nominal network, a data value indicating whether the terminal can access a first communications service via a first network access point, when the program is executed by a processor of a server of the nominal network, wherein the method comprises:
- receiving, by the server of the nominal network, a request relating to the first communications service, sent by the terminal via the first network access point, said request being a request for registration of the terminal for at least the first communications service with the nominal network, said first network access point being already used by the terminal for accessing a second communications service,
- detecting that the terminal is connected to a communications network different from the nominal network, called visited network,
- when the terminal is connected to the visited network, determining a data value indicating whether the terminal can access the first communications service via said first network access point, and
- sending a message comprising said data value to the terminal.

* * * * *